United States Patent Office 3,088,659
Patented May 7, 1963

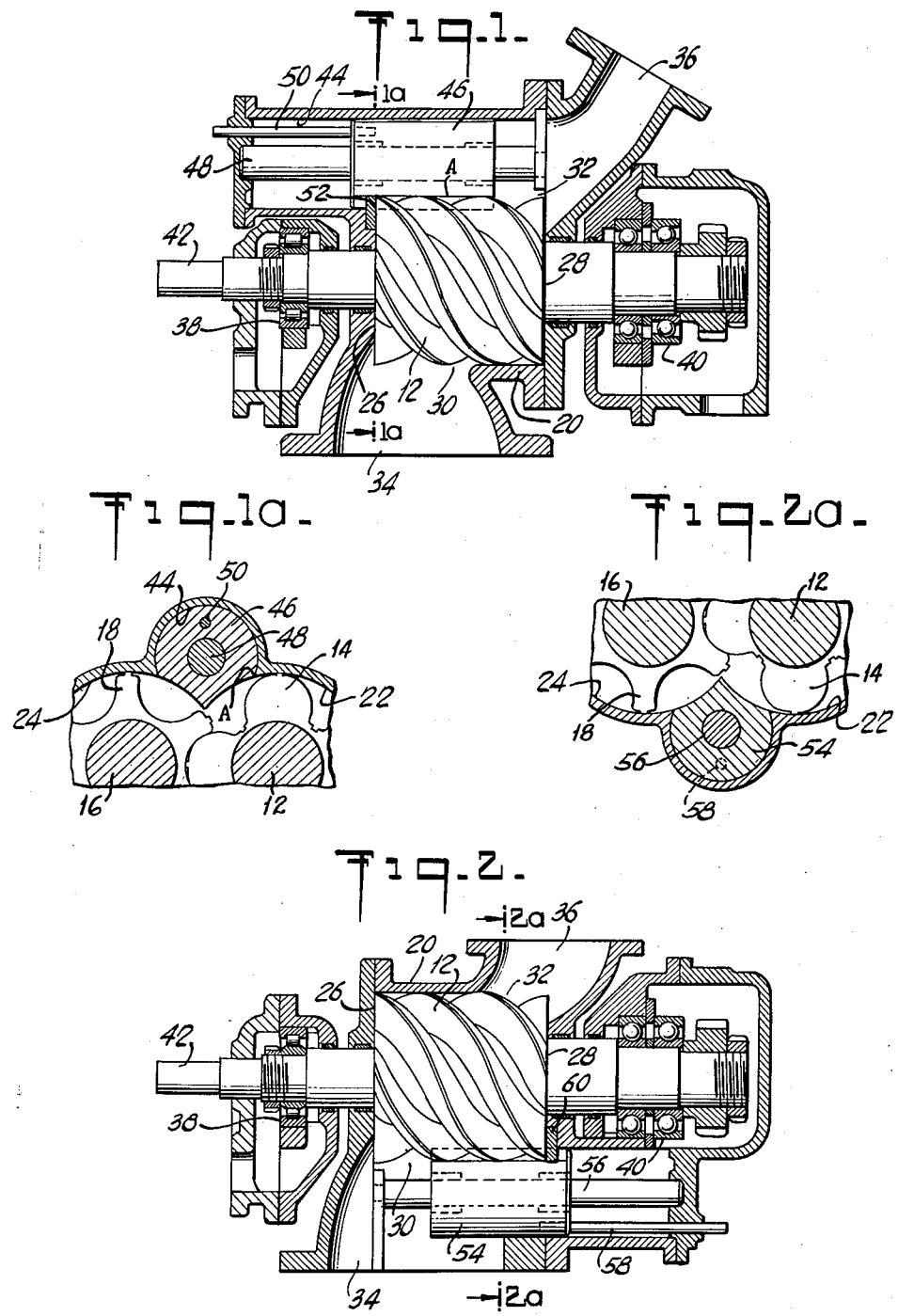

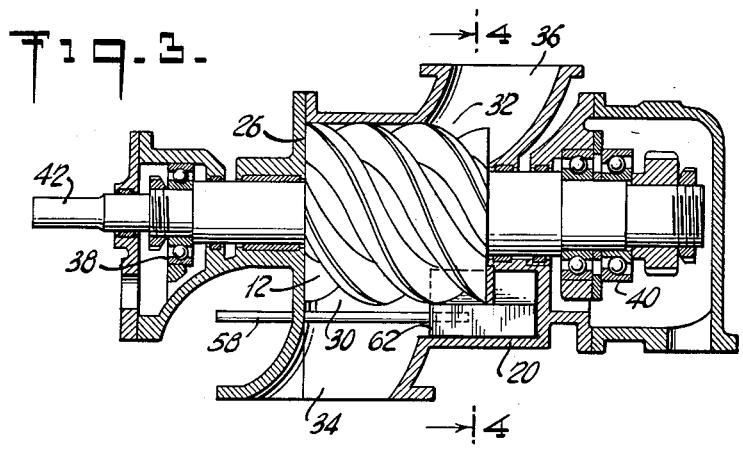
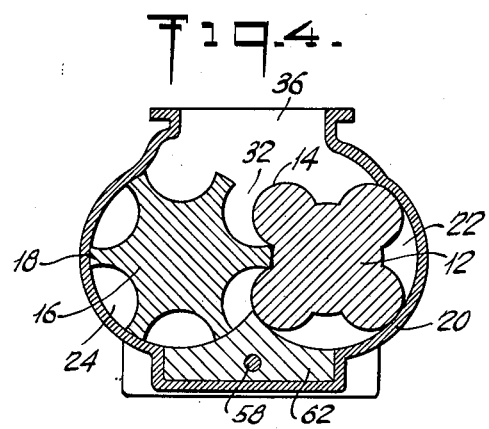
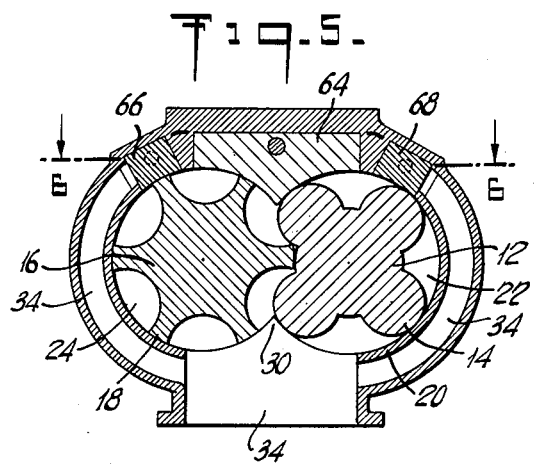

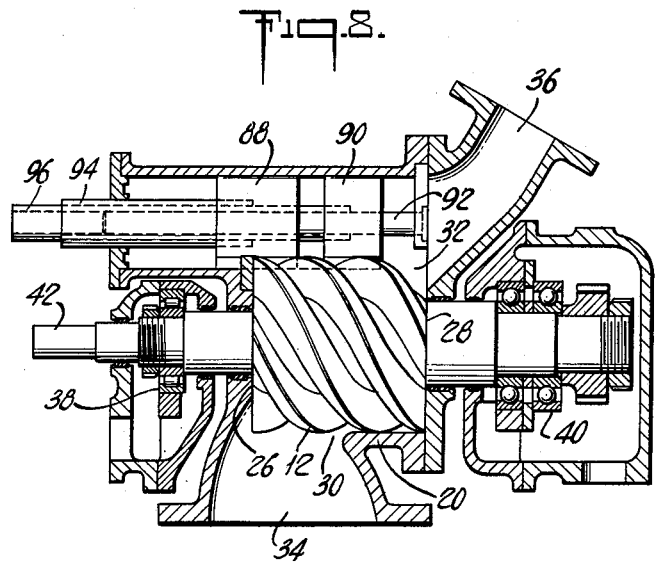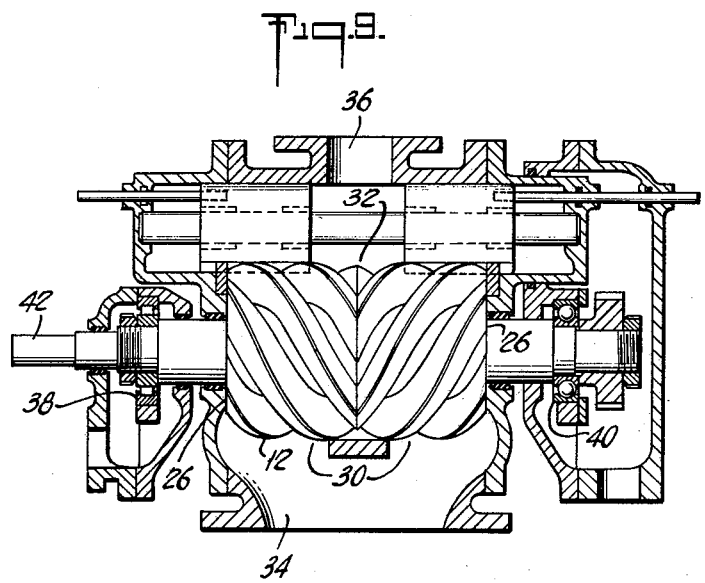

3,088,659
MEANS FOR REGULATING HELICAL ROTARY PISTON ENGINES
Hans Robert Nilsson, Ektorp, and Lauritz Benedictus Schibbye, Saltsjo-Duvnas, Sweden, assignor to Svenska-Rotor Maskiner Aktiebolag, Nacka, Sweden, a corporation of Sweden
Filed June 17, 1960, Ser. No. 36,763
10 Claims. (Cl. 230—138)

The present invention relates to rotary piston, positive displacement elastic fluid engines of the helical or screw rotor type adapted to be operated either as compressors or as expanders and having in-built pressure ratios of compression or expansion, as the case may be. Such engines are old in the art and have gone into commercial use in many different kinds of industrial applications, in some of which constant full load operation is called for, in others of which alternate off and on operation, either at idling or at full load, is required, and in still others of which variably regulated operation both as to quantity of fluid handled and/or pressure ratio produced, is required. It is the latter type of operation with which the present invention is concerned and the primary and general object of the invention is the provision of new and improved forms of valve means for enabling efficient part load operation of such engines to be obtained over a wide range of load variations and with such variations in load capacity being obtained either by control of the quantity of fluid handled or by control of the pressure ratio developed, or both. Others and more detailed objects of the invention will hereinafter appear as this specification proceeds.

The invention is particularly well suited for use to provide regulation for apparatus of the kind disclosed in U.S. Letters Patent No. 2,622,787, granted December 23, 1952, on the application of Hans Robert Nilsson, and by way of example but without limitation, the present invention is illustrated in the accompanying drawings and is hereinafter described as applied to apparatus of the kind disclosed in that patent. Further, for the sake of simplicity, it is herein described by way of example in connection with such apparatus when used as a compressor, although it will be understood that the utility of the invention extends equally to the use of the apparatus as an expander.

For a better understanding of the more detailed nature of the invention and the manner in which its several objects are attained, reference may best be had to the ensuing portion of this specification, descriptive of different embodiments of apparatus given by way of example but without limitation, suitable for carrying the invention in its several aspects into effect, and to be taken in conjunction with the accompanying drawings, in which;

FIG. 1 is a longitudinal central view partly in section and partly in elevation of an engine provided with regulating valve means embodying the invention for controlling the pressure ratio developed by the engine;

FIG. 1a is a fragmentary tranverse section taken on the line 1a—1a of FIG. 1;

FIG. 2 is a view similar to FIG. 1 of another embodiment of the invention providing regulating valve means for controlling the capacity of the engine;

FIG. 2a is a fragmentary section taken on the line 2a—2a of FIG. 2;

FIG. 3 is a view similar to FIGS. 1 and 2 showing still another embodiment of the invention having regulating valve means for controlling the capacity of the engine;

FIG. 4 is a section taken on the line 4—4 of FIG. 3;

FIG. 5 is a cross section taken on the line 5—5 of FIG. 6, showing a further embodiment of the invention having separate regulating valve members for separately controlling both the pressure ratio and the capacity of the engine;

FIG. 8 is a view similar to FIGS. 1 and 2 showing still another embodiment of regulating valve members for separately controlling both the pressure ratio and the capacity of the engine; and FIG. 9 is a view similar to FIGS. 1 and 2 showing an engine with rotors of the double helical or herringbone type and provided with regulating valve means for controlling the pressure ratio of the engine.

Figure 6:
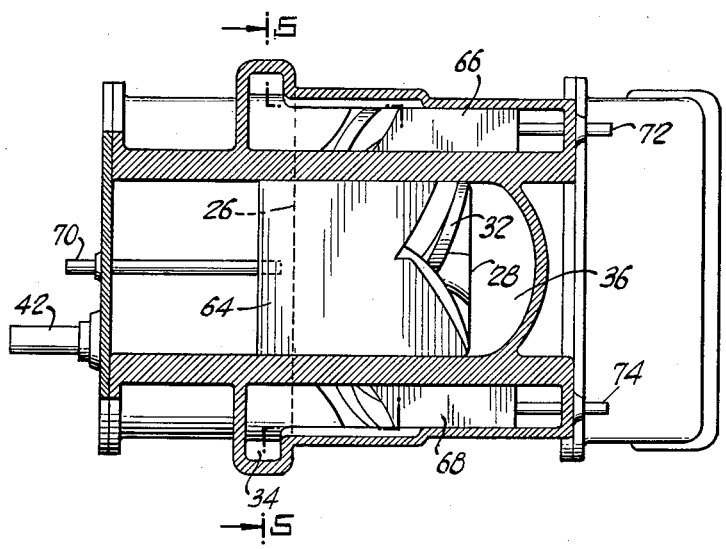
FIG. 6 is a longitudinal view partly in elevation and partly in section taken on the line 6—6 of FIG. 5.

Referring now to the drawings and more particularly to the embodiment shown in FIGS. 1 and 1a, it will be observed that the engine is of the well-known kind disclosed in the aforesaid Nilsson patent and embodies the known structural features and mode of operation now to be briefly described.

The apparatus shown comprises a casing structure having a central barrel portion 20 located between end wall portions 26 and 28, and providing a working space formed by two intersecting bores 22 and 24 having coplanar axes extending through the barrel portion of the casing structure. A male rotor 12 having helical lands 14 and intervening grooves is mounted to rotate in bore 22 by means of bearings 38 and 40 and a female rotor 16 provided with helical lands 18 and intervening grooves is mounted by means of similar bearings to rotate in the bore 24 with its lands in intermeshing relation with those of the male rotor. It is characteristic of these rotors that the flanks of the lands 14 of the male rotor 12 are convexly curved and with their intervening grooves lie substantially outside the pitch circle of the male rotor, while the lands 18 of the female rotor 16 are concavely curved and with their intervening grooves lie substantially inside the pitch circle of the femal rotor. It is further characteristic of such rotors that the effective wrap angle of the lands is less than 360°. The casing structure is provided with a high pressure port 32, the major portion of which lies on one side of the plane through the axes of the rotors and which in the embodiment illustrated is located in the high pressure end wall portion 28 of the engine, this port communicating with the high pressure fluid passage or connection 36. The casing structure further provides a low pressure port 30, the major portion of which is located on the side of the plane through the rotor axes opposite that on which the high pressure port 32 is located. In this embodiment the low pressure port is located partly in the barrel portion 20 of the casing structure and partly in the low pressure end wall portion 26 with the port communicating with the low pressure fluid passage or connection 34.

The barrel portion of the casing structure is further provided with a centrally located axially extending cylindrical recess 44 in open communication at one end with the high pressure port 32 and at its other end extending axially beyond the low pressure end wall 26. The portion of the recess lying between the high pressure and low pressure end walls is in open communication with the working space provided by the bores 22 and 24. In the recess 44 a regulating valve member 46 is slidably mounted upon an axially extending guide 48, and its axial position within the recess is adjusted by means of a control rod 50. As will be seen from FIG. 1a the inner surface of the valve member 46, confronting the rotors is shaped to provide a replacement for the cutaway portions of the walls of the bores 22 and 24. In the low pressure end wall portion 26, a sealing plate 52 is provided having a profile coinciding with that of the valve member 46.

With the engine operating as a compressor, the female rotor is turned in clockwise direction and the male rotor in counterclockwise direction, as viewed in FIG. 1a, as for example by power applied to the stub shaft 42 on the male rotor 12, and elastic fluid such for example as air is drawn into and fills the grooves of the rotors through the low pressure port 30. As the rotors revolve, mating pairs of lands of the male and female rotor intermesh at the top or high pressure side of the engine to cause mating pairs of groove portions to form chevron shaped working chambers the apex ends of which are determined by the intermeshing lands of the rotors and the base ends of which are determined by a fixed transverse plane, which in the present embodiment is the plane of the face of the high pressure end wall 28. As the rotors continue to revolve, these working chambers which in the case of a compressor constitute compression chambers, diminish in volume as the point of intermesh between any two lands determining the apex end of a given compression chamber moves axially toward the high pressure end wall to diminish the volume of the compression chamber until the chamber runs out to zero volume as the point of intermesh reaches the plane of the high pressure end wall. Closure of the compression chambers is effected by the inner face of the valve member 46 which is in confronting and sealing relation with the crests of the lands defining the boundaries of the compression chambers. Discharge of compressed fluid is effected when the crests of the rotor lands defining the leading edges of the compression chambers pass the control edge of the valve means which in the present instance is the right hand end edge of the regulating valve member 46, to establish communication between the chambers and the high pressure port 32 and connection 36. Movement of the regulating valve member 46 to the right operates to delay the time in the compression phase of the cycle when communication with the outlet port is established, and since the initial volume of the compression chambers is constant and delay in the timing of the opening of the compression chambers to the high pressure port results in diminishing the volume of the chambers before discharge therefrom occurs, it follows that movement of the regulating valve to the right results in increasing the ratio of compression developed by the compressor. Conversely movement of the regulating valve member to the left results in decreasing the pressure ratio produced. This action is predicated upon the premise that the initial volume of the compression chambers is constant and this condition is met due to the fact that in all positions of adjustment the valve member 46 extends past the low pressure end of the rotors, so that regardless of the position of the valve, the closed compression chambers are initially formed by the intermeshing lands with the apex ends of the compression chambers located axially at the low pressure end wall, so that when such chambers are formed they are always of the same initial volume.

From the foregoing, it will be seen that in this embodiment of the apparatus, only the pressure ratio is varied by adjustment of the regulating valve, the quantity of fluid inducted and being compressed not being altered by the regulation.

In the embodiment shown in FIGS. 2 and 2a, a compressor of the same kind as that shown in FIG. 1 is provided with a regulating valve member 54 slidably mounted on guide 56 and actuated by control rod 58, this valve member being located in an appropriate recess on the low pressure side of the compressor. In this case, the recess receiving the valve member extends axially beyond the high pressure end wall of the compressor.

On the low pressure side of the engine the intermeshing lands of the rotors come into intermesh at the plane of the low pressure end wall 26, and as the rotors revolve the apex ends of chevron shaped admission chambers which are thus formed move away from the low pressure end wall, thus forming admission chambers of expanding volume which reach their maximum volume when the point of intermesh reaches the high pressure end wall. As will be seen from FIG. 2, entry of fluid into admission chambers is possible only so long as flow from the low pressure connection 34 through the low pressure port 30 is not obstructed by the regulating valve 54. The left hand edge of this valve member constitutes the regulating or cutoff edge, and if the valve is adjusted for example as shown in FIG. 2, the regulating edge operates to cut off communication between the admission chambers and the low pressure or inlet connection 34, before the chambers expand to their maximum volume, which occurs only when the point of intermesh between the lands reaches the high pressure end wall. Thus, with the regulating valve in the position of adjustment shown in FIG. 2, the admission chambers are cut off from the inlet before reaching their maximum volume and the fluid trapped therein is expanded as the chambers expand to their maximum volume, to be thereafter recompressed to admission pressure and further compressed to a pressure above admission pressure in the chevron shaped compression chambers which are formed by the intermesh of the lands on the high pressure side of the machine.

With the form of apparatus just described, regulation to decrease the quantity of fluid compressed does not affect the pressure ratio developed in the compression chamber but as regulation is effected to reduce the quantity of fluid compressed, such reduction is accompanied by a decrease in the delivery pressure of the fluid, since compression is initiated from the depressed initial pressures which result from the manner in which the quantity of fluid to be compressed is reduced by cutting off admission to the admission chambers before they reach full volume.

FIGS. 3 and 4 illustrate an embodiment which functions in the same manner as that just described, the sole difference being in the cross-sectional shape of the valve member and the mounting of the valve member to slide directly in the valve recess in the casing structure rather than upon a separate guide member such as the guide 56 shown in FIG. 2.

FIGS. 5 and 6 illustrate a further embodiment in which both the pressure ratio and the capacity of the machine can be separately regulated. In this embodiment valve member 64, which operates to control the pressure ratio, is shifted axially by means of the control rod 70 to vary the size of the high pressure port 32 which in this embodiment is located at least in part in the barrel portion of the casing structure, as seen from FIG. 6. For the purpose of varying the pressure ratio the valve member 64 functions exactly as does the valve member 46 shown in the embodiment illustrated in FIG. 1, the valve however, as will be seen from FIG. 5, having the form of profile and being mounted to slide directly in the casing structure, like the valve member 62 shown in FIG. 4.

For controlling the quantity of fluid to be compressed, separate valve means is employed, and in the present embodiment this means is comprised of two valve members 66 and 68, slidably mounted in suitable recesses in the barrel portion of the casing structure on the same side of the plane of the rotor axes as is the valve member 64. The valve members 66 and 68, as will be seen from FIG. 6, are movable in suitable recesses which extend beyond the high pressure end wall of the working space of the compressor. As will further be seen from FIG. 6, when valve members 66 and 68 are moved as far to the right as possible in FIG. 6, the compression chambers, formed on the grooves by the upper sides of the rotors and the confronting portions of the walls of the casing bores and of the sealing surfaces of the valve members 66 and 68, will initiate compression from a condition of maximum volume, and, since the admission chambers in this embodiment are always filled to full capacity with fluid at full admission pressure, the compressor will deliver compressed fluid at full capacity.

If, now, valve members 66 and 68, or either of them, is moved to the right from closed position to a position such as the positions shown in FIG. 6, initiation of the compression phase of the cycle is delayed until the groove portions forming any given compression chamber move to the right as seen in FIG. 6 until they are covered by the regulating valve members. Until the time at which the compression chambers are closed by the valve members and compression initiated, the excess fluid is ejected from the chambers and flows back to the inlet of the compressor through the over-flow or by-pass passage 34.

The regulation of the quantity or capacity of the compressor effected by the modification just described differs from the regulation effected by the embodiment shown in FIG. 2, by commencing the compression phase of the cycle from different volumes of fluid always at normal admission pressure, instead of always commencing compression with the same valume of fluid but with the fluid at different degrees of depressed pressure as compared with normal admission pressure. In the present embodiment, reduction in the quantity of fluid compressed by opening the regulating valves 66 and 68, will result in reduced delivery pressure if the valve member 64 remains in a given fixed position. However, any desired pressure ratio may be maintained constant regardless of variations in the quantity being compressed by proper compensating adjustment of the valve member 64 to delay the termination of the compression phase of the cycle as the commencement of the compression phase is delayed.

Also, as will be seen from FIG. 6, the control edges of the regulating valve members, particularly of high pressure valve members such as member 64 which in effect forms the edge of the high pressure port, are preferably shaped to conform with the crest lines of the rotor lands which pass these edges, in accordance with known prior practice.

Figure 7:
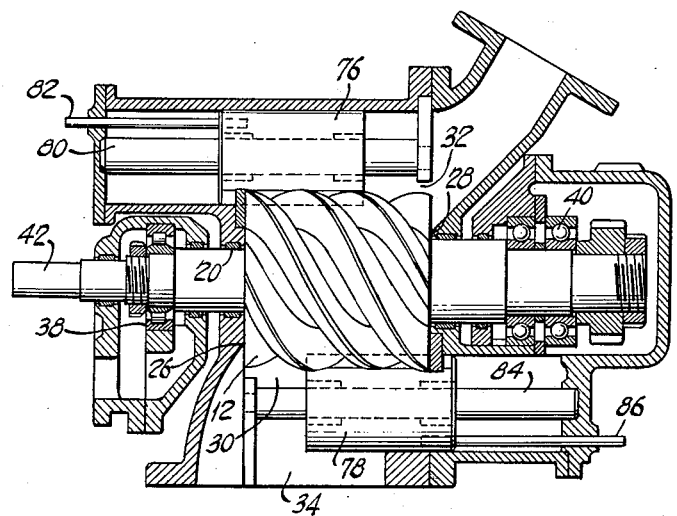
FIG. 7 is a view similar to FIGS. 1 and 2, showing an engine providing another embodiment of the invention with separate regulating valve members for separately controlling the pressure ratio and the capacity of the engine.

Separate regulation of both pressure ratio and quantity may also readily be obtained by an arrangement such as the embodiment shown in FIG. 7, which in effect combines the two valve structures separately employed in the embodiments shown in FIGS. 1 and 2 respectively. In the embodiment of FIG. 7 a valve member 76 similar to valve member 46 of FIG. 1, is slidably mounted on rod 80 and actuated by means of the control rod 82. This valve functions exactly as does valve 46 in the modification of FIG. 1. Likewise, valve member 78 mounted on rod 84 and actuated by control rod 86 corresponds to valve member 54 of the modification of FIG. 2 and functions in precisely the same way to control the capacity of the compressor. With this arrangement, delivery pressure may be maintained constant regardless of the percentage of capacity at which the machine is being operated.

FIG. 8 illustrates still another embodiment in which both pressure ratio and capacity can be independently regulated. In this embodiment a regulating valve means comprises two valve members 88 and 90, both slidably mounted independently of each other to move axially in a recess on the high pressure side of the compressor and extending axially beyond the low pressure end wall portion of the casing structure, the recess being similar to the recess 44 of the modification of FIG. 1. Valve member 90 is mounted to slide on the guide 92 and is provided with an actuating rod 96. Valve member 88 is annular and is mounted to slide on the rod 96 projecting from the valve member 90. It is further provided with an annular actuating rod 94, also adapted to slide on the rod 96.

In this form of the apparatus, when the two valve members 88 and 90 are adjusted so as to be in contact with each other, the combined valves, acting together function in precisely the same way as the valve member 46 of the modification of FIG. 1 to regulate the pressure ratio without affecting the capacity of the machine. If, on the other hand, the valve members 88 and 90 are separated, as shown in FIG. 8, commencement of the compression phase of the cycle is delayed and fluid is by-passed back to the inlet side of the compressor through the grooves of the rotors, in much the same fashion as fluid is by-passed back to the inlet side of the compressor in the modification of FIGS. 5 and 6 through the passage 34.

In FIG. 9 an embodiment is illustrated, showing the application of pressure ratio controlling valve means of the kind shown in FIG. 1 to a compressor of the double-helical or herringbone rotor type. In this modification a single recess extending axially beyond both low pressure end walls 26 houses two valve members 98 and 100, each independently slidable upon a common guide 102 and adapted to be synchronously moved in opposed directions by means of the suitably controlled actuating rods 104 and 106. Functionally, this modification operates just as does the modification of FIG. 1.

From the foregoing description of the functioning of the apparatus as a compressor, it is believed that its manner of functioning as an expander will be more or less obvious. In this connection, however, it is to be noted that when the machine is operating as an expander, adjustment of the high pressure valve members such as 46 in FIG. 1, 64 in FIG. 6, 76 in FIG. 7, 88 and 90 when operating together as a unit in FIG. 8, and 98 and 100 in FIG. 9, operates to regulate the quantity of pressure fluid admitted to the machine for expansion therein as well as to regulate the expansion ratio. The reason for this is that whereas when the machine is operating as a compressor the quantity of fluid compressed is not affected by the relationship of the control edge of the regulating valve to the high pressure port, in the case of an expander this relationship determines the size of the pressure chamber which is filled by the high pressure fluid admitted to the machine before the individual pressure chambers are cut off from communication with the inlet port and commence their expansion phase of their cycle.

The several embodiments of apparatus hereinbefore described are believed sufficient to demonstrate the fact that the principles of the invention may be embodied in many different specific forms of apparatus, and accordingly the invention is to be understood as embracing all forms of apparatus falling within the scope of the appended claims.

We claim:

1. A rotary piston, positive displacement elastic fluid engine comprising a casing structure providing a barrel portion having intersecting bores with coplanar axes located between axially spaced end wall portions and further providing spaced apart low pressure and high pressure ports communicating with said bores, rotors provided with helical lands and grooves having a wrap angle of less than 360° rotatably mounted in said bores between said end wall portions and comprising a male rotor having lands provided with convexly curved flanks and intervening grooves the major portions of which lie outside the pitch circle of the male rotor and a female rotor having lands provided with concavely curved flanks and intervening grooves the major portions of which lie inside the pitch circle of the female rotor, the lands and grooves of said rotors intermeshing to form with the casing structure chevron-shaped working chambers each comprised of communicating portions of a male rotor groove and a female rotor groove, said chambers being defined at their base ends by an axially fixed transverse plane and at their apex ends by the intermeshing lands of the rotors and said apex ends moving toward said fixed plane and said chambers coming into communication with said high pressure port as the rotors revolve to cause said chambers to run out to zero volume at said fixed plane when the engine is operating as a compressor and said apex ends moving away from said plane and out of communication with said port as said chambers are created from zero volume when the engine is operating as an expander, valve means for regulating elastic fluid passing through said engine, said valve means comprising an axially extending recess in the barrel portion of said casing structure in open communication with said bores and a valve member axially slidable in said recess, the inner face of said valve member being complementary to the envelope of that portion of the bores of the casing structure confronted by the opening of said recess communicating with the bore portion of the casing structure, whereby said valve member is in sealing relation with the confronting rotor structure, one of said ports having a portion located in the barrel portion of the casing structure, said valve member being movable between terminal positions in one of which said port portion is fully opened and in the other of which said port portion has a predetermined minimum area determined by an edge of said valve member, and the length of said valve member being sufficient to cover the entire remaining length of the confronting portion of the rotor structure throughout the range of movement of the valve member between its terminal positions, and means for moving said valve member between said terminal positions.

2. An engine as defined in claim 1 in which the end of the valve member determinative of the extent of the opening of the port is shaped to conform with the crest line of the confronting rotor structure.

3. An engine as defined in claim 1 in which said casing structure and said recess therein extend axially beyond one end of said rotors to receive the portion of said valve member remote from said port area determining edge when said valve is in positions other than that determinative of minimum port area.

4. An engine as defined in claim 3 in which said valve means controls the high pressure port and said recess extends axially beyond the low pressure ends of the rotors.

5. An engine as defined in claim 4 in which said valve member comprises two axially aligned separate valve elements and said control means comprises elements for separately controlling the positions of each of said elements.

6. An engine as defined in claim 4 in which said high pressure port is located on one side of the plane of the rotor axes and said valve means includes an additional recess and valve member for venting said working chambers to the low pressure side of the compressor until the chambers have been reduced in volume to a predetermined value when the engine is operated as a compressor.

7. An engine as defined in claim 6 in which said additional valve means is located on the same side of said plane as the high pressure port and the recess thereof extends axially beyond the high pressure ends of the rotors.

8. An engine as defined in claim 4 in which the major portion of the low pressure port is located on the side of the plane of the rotors opposite that of the high pressure port and said valve means includes an additional recess and valve member for controlling the low pressure port, said additional recess extending axially beyond the high pressure ends of the rotors.

9. An engine as defined in claim 3 in which said valve means controls the low pressure port and said recess extends axially beyond the high pressure ends of the rotors.

10. An engine as defined in claim 3 in which said rotors are of the herringbone type, said high pressure port is located intermediate the ends of the rotors, and said valve means comprises two recesses extending respectively axially beyond the opposite low pressure ends of the rotors and separate valve members operable in each of said recesses for governing the area of said port.

References Cited in the file of this patent
UNITED STATES PATENTS

| | | |
|---|---|---|
| Re. 23,948 | Fuller | Feb. 15, 1955 |
| 2,358,815 | Lysholm | Sept. 26, 1944 |
| 2,519,913 | Lysholm | Aug. 22, 1950 |

FOREIGN PATENTS

| | | |
|---|---|---|
| 272,010 | Switzerland | Apr. 16, 1951 |
| 384,355 | Great Britain | Dec. 8, 1932 |
| 696,732 | Great Britain | Sept. 9, 1953 |